United States Patent

Röhm

[11] 3,938,817
[45] Feb. 17, 1976

[54] CHUCK FOR IMPACT-TYPE DRILL

[76] Inventor: Günter Horst Röhm, Heinrich-Rohm-Str. 50, 7927 Sontheim (Brenz), Germany

[22] Filed: Nov. 12, 1973

[21] Appl. No.: 414,824

Related U.S. Application Data

[63] Continuation-in-part of Ser. No. 377,730, July 9, 1973, abandoned.

[30] Foreign Application Priority Data

Nov. 10, 1972 Germany.................................. 7241181

[52] U.S. Cl. ..................................... 279/61; 279/60
[51] Int. Cl.² .......................................... B23B 5/22
[58] Field of Search ............. 279/60, 61, 62, 63, 64

[56] References Cited
UNITED STATES PATENTS 3,680,877  8/1972  Happe.................................. 279/62
3,810,642  5/1974  Derbyshire........................... 279/62

FOREIGN PATENTS OR APPLICATIONS 829,978  1/1952  Germany............................. 279/60
795,312  4/1936  France................................ 279/64

Primary Examiner—J. M. Meister
Assistant Examiner—W. R. Briggs
Attorney, Agent, or Firm—Karl F. Ross; Herbert Dubno

[57] ABSTRACT

A chuck has a chuck body adapted to be rotated about an axis and formed with an axial passage having a seat on which three jaws are slidable to grasp a tool shank. A tightening ring is formed on its inner periphery with threads that engage threads on the jaws to displace them axially. A cylindrical sleeve has one end resting on an outside ledge formed on the ring and is deformed at this one end into a groove on the ring which has a sharp edge that bites into the sleeve.

1 Claim, 3 Drawing Figures

CHUCK FOR IMPACT-TYPE DRILL

CROSS-REFERENCE TO RELATED APPLICATIONS

This application is related to my copending application Ser. No. 268,752 filed on 3 July 1972 for a SELF-TIGHTENING DRILL CHUCK (Now U.S. Pat. No. 3,795,406) and is a continuation-in-part of my copending application Ser. No. 377,730 filed on 9 July 1973 for a DRILL CHUCK FOR POLYGONAL-SECTION AND CIRCULAR-SECTION BITS (now abandoned).

FIELD OF THE INVENTION

The present invention relates to a drill chuck. More specifically this invention concerns a heavy-duty chuck for use in a rotary drill of the impact type.

BACKGROUND OF THE INVENTION

A conventional type of drill chuck has a chuck body formed with an axial passage itself having a tapered seat on which three jaws slide. A ring is threaded on the three jaws so that when it is rotated the jaws move axially in the passage to grip the shank of a tool inserted in the passage.

In order to cover the ends of the jaws and to permit hand tightening of the chuck a cover or guide sleeve surrounds the chuck body above the tightening ring and has one end secured to this ring. The ring and sleeve are usually connected together by a simple force fit. In impact-type drills such an arrangement is insufficiently strong, however, especially in view of the fact that the sleeve in turn is axially coupled to the chuck body. In such devices it is common to form the outer periphery of the tightening ring and the inner wall of the ring with matching grooves in which an eye wire is inserted. This type of connection is not rigid, and is relatively expensive to make.

In my above-cited copending application Ser. No. 377,730 I describe such a chuck wherein the jaws are each formed with two axially elongated teeth having inwardly directed bearing edges which are spaced from each other transversely and are also spaced inwardly of the longitudinal edges of the bearing face of the respective jaw. These teeth are triangular in section and their bearing edges lie on a plane tangent to a cylinder centered on the axis of the tool-receiving hole in the chuck. Between the teeth each jaw is formed with a connecting region which lies wholly radially outside of the respective tangent plane.

With such a structure the facets of a tool of prismatic section are engaged at two angularly spaced locations, greatly stabilizing the tool and preventing twisting thereof relative to the chuck. A tool with a shank of hexagonal section, for example, will have three of its facets each engaged at two separate locations, so that six different regions of line contact with the shank are formed. Similarly a circular-section tool is engaged at three different locations at least, and if the connecting region lies on cylinder centered on the chuck axis and touching each bearing edge, it is engaged at more locations.

In accordance with another feature of my earlier invention, each jaw is formed between its two teeth with a third tooth parallel to these teeth. This third tooth has a bearing edge which lies on a cylinder as described above which is centered on the chuck axis and on which the two outer bearing edges lie. Thus in a three-jaw drill chuck a tool having a circular-section shank can be engaged in nine separate locations. The most secure possible gripping of both prismatic and circular tool shanks therefore is possible.

The drill chuck of my earlier invention generally comprises three jaws angularly equispaced about the axis and having tool-engaging faces which are moved parallel to themselves by a nut rotatably mounted on the body of the chuck which is attached to the shaft of a rotary impact drill by threads formed on outer tapered surfaces of the jaws. The tool-engaging faces each have a pair of main gripping edges or cutting teeth inwardly of the edges of the face and lying on opposite sides of a symmetry plane through the jaw and including the chuck axis. Along this plane is a central edge or cutting tooth which is radially set back from the main gripping edge or cutting tooth so that all three gripping edges or cutting teeth lie along generatrices of a right-circular cylinder centered on the chuck axis. The term, "edge" or "tooth" as used here is intended to describe formations which, at least prior to wear or use of the chuck, have angle profiles, preferably defined by flanks including an angle of at most 90° and, most advantageously, at most 60°, the teeth being hardened so as to bite into the tool seized thereby. Each tooth, moreover, is symmetrical about a bisecting plane coinciding (in the case of the central tooth) with the symmetry plane and parallel (in the case of the outer teeth) with the symmetry plane. The grooves between the teeth are likewise of V-section.

OBJECTS OF THE INVENTION

It is an object of the present invention to provide an improved drill chuck using principles developed in my above-cited earlier patent application.

A further object is a method of making such a chuck.

Another object is the provision of such a chuck which is inexpensive to manufacture and which is more robust than the prior-art chucks.

SUMMARY OF THE INVENTION

These objects are attained according to the present invention in a drill chuck of the above-described general type wherein the tightening ring is formed with a sharp-edged shoulder on its outer periphery. The sleeve surrounds the ring at the shoulder and is plastically deformed over this shoulder so as to form a very solid connection between these two elements.

In accordance with another feature of this invention the ring is formed on its outer periphery with a groove one of whose flanks extends perpendicular to the chuck axis and constitutes the shoulder. The sleeve is formed at one end with an inwardly projecting ridge that is plastically deformed into this groove.

The sleeve according to the invention is formed at one of its ends on its inside wall with the ridge, and on the opposite region at the outer wall with a frustoconical bevel. A die formed with a seat corresponding to the shape of the bevel in the assembled chuck is used to secure the sleeve to the tightening ring. The sleeve is fitted onto the otherwise complete chuck and its end is set on the die, then axial force is applied to the sleeve to plastically and permanently deform the sleeve inwardly, thereby making the bevel and the ridge.

In a chuck so made the sleeve is virtually unitary with the ring. This solid connection is made without great difficulty or expense and withstands the considerable jarring produced by an impact drill.

DESCRIPTION OF THE DRAWING

The above and other objects, features, and advantages will become more readily apparent from the following description, given with reference to the accompanying drawing in which.

SPECIFIC DESCRIPTION

Figure 1:
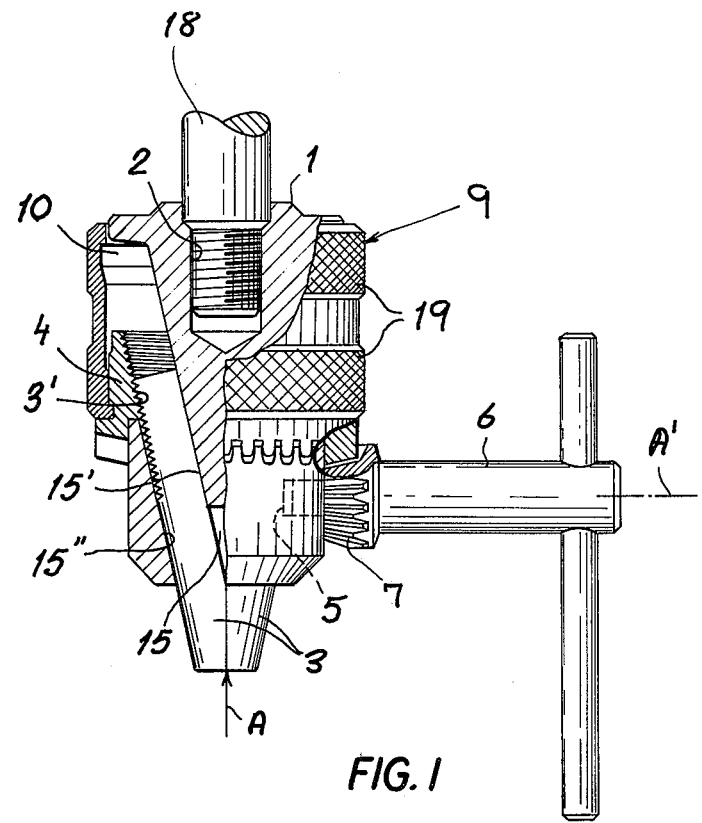
FIG. 1 is a side-elevational view partly in section through a chuck according to this invention.

The chuck shown in FIG. 1 has a steel body 1 which is formed at one end with a threaded axial hole 2 adapted to receive the shaft 18 of an impact hammer and at the other end with a passage 15 extending back as three passages 15' each receiving a respective jaw 3. As described in U.S. Pat. application Ser. No. 377,730 mentioned above, the jaws 3 are each formed with a threaded region 3' that meshes with the threaded inner periphery of a tightening ring 4. The body is formed with a radially opening blind bore 5 in which a conventional chuck key 6 having bevel-type gear teeth 7 can fit. Similar bevel teeth 8 mesh with the teeth 7 so that rotation of the key 6 about its axis A' perpendicular to the axis A of the chuck body 1 rotates the ring 4 relative to the body 1 and screws the teeth 3 along the tapered seat 15''.

A cylindrically tubular sleeve 9 formed with a pair of milled regions 19 surrounds the body 1 above the ring 4 and has a formation 10 which axially links it to the body 1 but allows it to rotate on this body 1.

Figure 3:
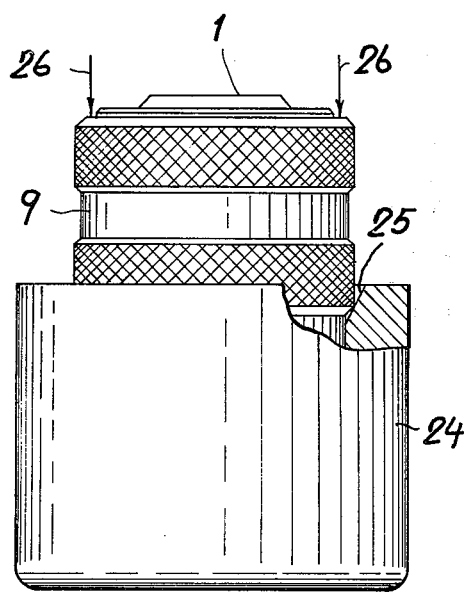
FIG. 3 is a side-elevational view illustrating how the chuck according to the present invention is assembled.
Figure 2:
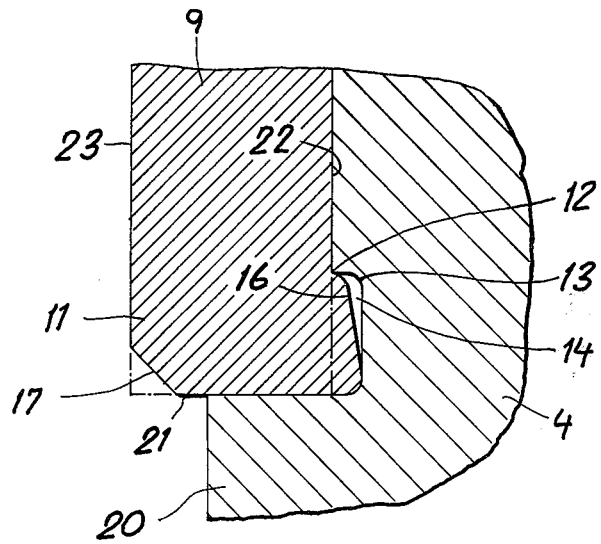
FIG. 2 is a large-scale sectional view of the detail indicated by arrow II in FIG. 1.

FIG. 2 shows how the body 4 is formed with a ledge 20 against which the end surface 21 of the sleeve 9 rests. Upwardly of this flange 20 the ring 4 is formed with a shallow rectangular-section groove 14 having an upper flank 13 forming a shoulder having a sharp right-angle edge 12. The sleeve is formed on its inner wall 22 with an inwardly directed ridge 16, formed by flattening the lower edge of its outer wall 23 as shown at 17. Originally the sleeve 9 has the shape shown by dot-dash lines. The deformed shape is obtained as shown in FIG. 3 by seating the chuck with its sleeve 9 in position in a die 24 having a frustoconical seat 25 and then applying pressure axially to the tube 9 as shown by arrows 26 to force it down into the die 24, thereby making the frustoconical formation 17 on the outside of the sleeve 9 and the ridge 16 on the inside.

In this manner the sleeve 9 is permanently plastically deformed and is made integral with the ring 4. Such an arrangement is relatively easy and inexpensive to produce, and is stronger than any hitherto proposed system.

I claim:

1. A chuck comprising:

a chuck body adapted to be rotated about an axis and having an axial passage formed with an axially tapered seat;

a plurality of jaws axially slidable on said seat;

a tightening ring surrounding said body and having a conically threaded inner periphery threadedly engaging said jaws for axial displacement of same and a cylindrical outer periphery formed with a sharp-edged shoulder; and a cylindrical sleeve surrounding said body and having one end plastically deformed over said shoulder, said ring being formed on its outside periphery with an outwardly open circumferential groove, having a pair of flanks, one of said flanks constituting said shoulder, said sleeve being formed at said one end with an inwardly projecting ridge received in said groove and a beveled outer edge, said ring being formed at one side of said groove with an outwardly projecting ledge forming a continuation of the other flank of said groove, said one end of said sleeve bearing on said ledge.

* * * * *